US006493482B1

(12) United States Patent
Al-hemyari et al.

(10) Patent No.: US 6,493,482 B1
(45) Date of Patent: Dec. 10, 2002

(54) OPTICAL SWITCH HAVING A PLANAR WAVEGUIDE AND A SHUTTER ACTUATOR

(75) Inventors: Kadhair Al-hemyari, Northville; Roydn D. Jones, Plymouth; Jose Luis Jimenez, Ann Arbor, all of MI (US)

(73) Assignee: L3 Optics, Inc., Cambridge, MA (US)

( * ) Notice: Subject to any disclaimer, the term of this patent is extended or adjusted under 35 U.S.C. 154(b) by 0 days.

(21) Appl. No.: 09/718,674

(22) Filed: Nov. 22, 2000

Related U.S. Application Data

(60) Provisional application No. 60/167,142, filed on Nov. 23, 1999.

(51) Int. Cl.$^7$ .............................. G02B 6/26; G02B 6/42
(52) U.S. Cl. ........................................... 385/19; 385/17
(58) Field of Search .............................. 385/16, 17, 18, 385/19–24, 14, 132, 131

(56) References Cited

U.S. PATENT DOCUMENTS

| | | | |
|---|---|---|---|
| 4,505,539 A | 3/1985 | Auracher et al. | 350/96.15 |
| 4,774,407 A | 9/1988 | Erbe | 250/227 |
| 4,836,636 A | 6/1989 | Obara et al. | 350/96.2 |
| 5,016,978 A | 5/1991 | Fargette et al. | 350/269 |
| 5,208,880 A | 5/1993 | Riza et al. | 385/18 |
| 5,923,798 A | 7/1999 | Aksyuk et al. | 385/19 |
| 6,075,239 A | 6/2000 | Aksyuk et al. | 250/227 |
| 6,108,466 A | 8/2000 | Aksyuk et al. | 385/19 |
| 6,195,478 B1 * | 2/2001 | Fouquet | 385/17 |
| 6,205,267 B1 | 3/2001 | Aksyuk et al. | 385/19 |
| 6,229,640 B1 | 5/2001 | Zhang | 359/290 |

FOREIGN PATENT DOCUMENTS

| | | |
|---|---|---|
| EP | 0 813 088 A1 | 12/1997 |
| EP | 0 935 149 A2 | 8/1999 |
| JP | 6-118317 | 4/1994 |
| WO | WO 00/25160 | 5/2000 |

OTHER PUBLICATIONS

Sklyarov, O.K., "A Two–Position Lightguide Optical Switch", Telecommunications and Radio Engineering, 48(7), No. 7, pp. 1–3 (1993).

Kanai, Tsuneo, et al., "Automated Optical Main–Distributing–Frame System", Journal of Lightwave Technology, vol. 12, No. 11, pp. 1986–91 (Nov., 1994).

* cited by examiner

Primary Examiner—Phan T. H. Palmer
(74) Attorney, Agent, or Firm—Edwards & Angell, LLP

(57) ABSTRACT

An optical switch having an input waveguide and two output waveguides separated by and disposed around a trench. The input waveguide and a first output waveguide have respective optical paths defined by their respective cores which are coaxial with each other. Those waveguides are also separated by a trench having a medium provided therein that has a refractive index different from that of the waveguides. The input waveguide and a second output waveguide are arranged generally on the same side of the trench such that an optical signal passing from the input waveguide to the second output waveguide does not completely traverse the trench. Each of the waveguides has a facet at least on of the facets is angled relative to the optical path of the respective waveguide

20 Claims, 7 Drawing Sheets

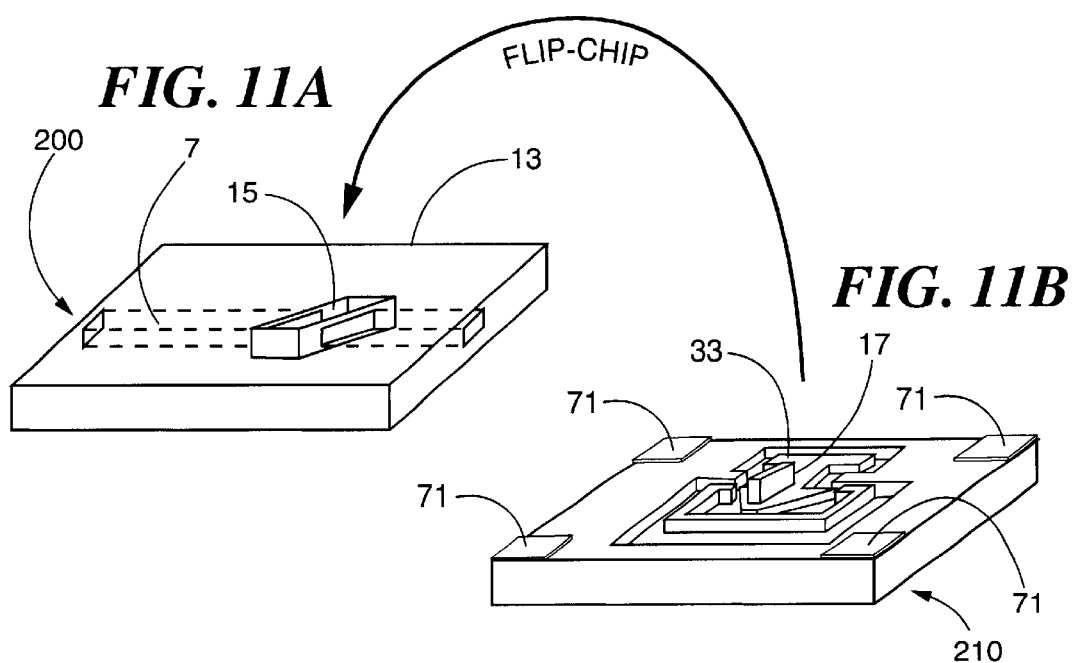
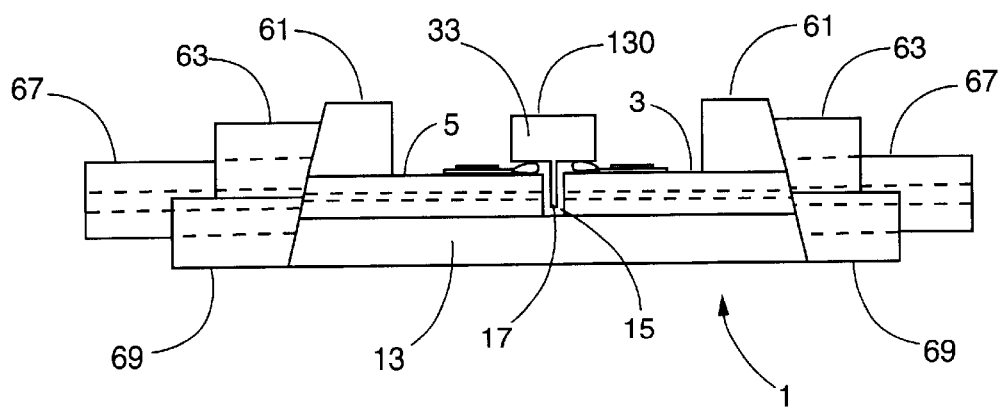
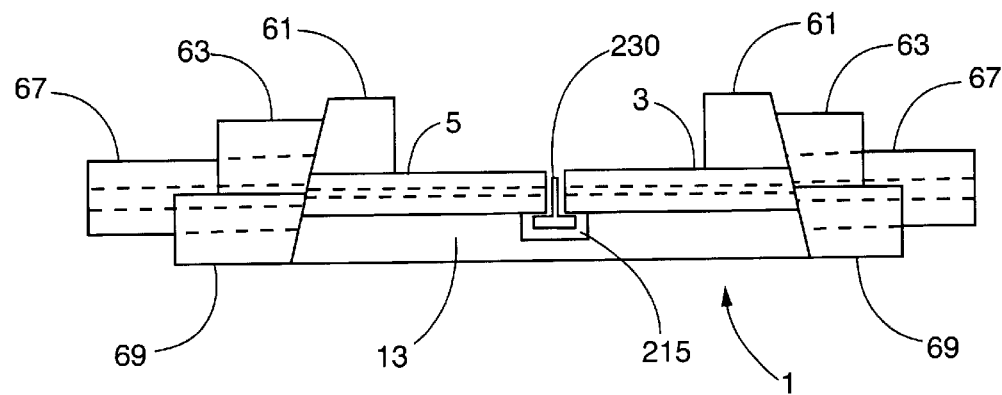

OPTICAL SWITCH HAVING A PLANAR WAVEGUIDE AND A SHUTTER ACTUATOR

CROSS-REFERENCE TO RELATED APPLICATION

This application claims priority to Provisional Patent Application No. 60/167,142, filed on Nov. 23, 1999.

FIELD OF THE INVENTION

The present invention is directed to an optical switch for switching light between an input waveguide and one or more output waveguides.

BACKGROUND OF THE INVENTION

Optical switches are essential components in an optical network for determining and controlling the path along which a light signal propagates. Typically, an optical signal (the terms "light signal" and optical signal" are used interchangeably herein and are intended to be broadly construed and to refer to visible, infrared, ultraviolet light, and the like), is guided by a waveguide along an optical path, typically defined by the waveguide core. It may become necessary or desirable to redirect the optical signal so that it propagates along a different optical path, i.e., through a different waveguide core. Transmission of an optical signal from one waveguide to another may require that the optical signal propagate through a medium which may have an index of refraction different than the index of refraction of the waveguides (which typically have approximately the same refractive index). It is known that the transmission characteristics of an optical signal may be caused to change if that signal passes through materials (mediums) having different indices of refraction. For example, an unintended phase shift may be introduced into an optical signal passing from a material having a first index of refraction to a material having a second index of refraction due to the difference in velocity of the signal as it propagates through the respective materials and due, at least in part, to the materials' respective refractive indices. Additionally, a reflected signal may be produced due to the mismatch of polarization fields at the interface between the two mediums. As used herein, the term "medium" is intended to be broadly construed and to include a vacuum.

This reflection of the optical signal is undesirable because it reduces the transmitted power by the amount of the reflected signal, and so causes a loss in the transmitted signal. In addition, the reflected signal may travel back in the direction of the optical source, which is also known as optical return loss. Optical return loss is highly undesirable, since it can destabilize the optical signal source.

If two materials (or mediums) have approximately the same index of refraction, there is no significant change in the transmission characteristics of an optical signal as it passes from one material to the other. One solution to the mismatch of refractive indices involves the use of an index matching fluid. A typical use in an optical switch is to fill a trench between at least two waveguides with a material having an index of refraction approximately equal to that of the waveguides. Thus, the optical signal does not experience any significant change in the index of refraction as it passes through the trench from one waveguide to another.

An example of that solution may be found in international patent application number WO 00/25160. That application describes a switch that uses a collimation matching fluid in the chamber between the light paths (i.e., between waveguides) to maintain the switch's optical performance. The use of an index matching fluid introduces a new set of considerations, including the possibility of leakage and a possible decrease in switch response time due to the drag on movement of the switching element in a fluid.

In addition, the optical signal will experience insertion loss as it passes across a trench and between waveguides. A still further concern is optical return loss caused by the discontinuity at the waveguide input/output facets and the trench. In general, as an optical signal passes through the trench, propagating along a propagation direction, it will encounter an input facet of a waveguide which, due to physical characteristics of that facet (e.g., reflectivity, verticality, waveguide material, etc.) may cause a reflection of part (in terms of optical power) of the optical signal to be directed back across the trench (i.e., an a direction opposite of the propagation direction). This is clearly undesirable.

Size is also an ever-present concern in the design, fabrication, and construction of optical components (i.e., devices, circuits, and systems). It is clearly desirable to provide smaller optical components so that optical devices, circuits, and systems may be fabricated more densely, consume less power, and operate more efficiently.

SUMMARY OF THE INVENTION

The present invention is directed to an optical switch having an input waveguide and two output waveguides separated by and disposed around a trench. The input waveguide and the first output waveguide have respective optical paths defined by their respective cores; those optical paths (and cores) generally being aligned or coaxial with each other. The trench has a medium provided therein that has a refractive index different from that of the waveguides. Back reflection is therefore avoided, since the input waveguide, the first output waveguide, and the second output waveguide are separated by a distance insufficient to affect the transmission characteristics of an optical signal propagating from the input waveguide to either the first or second output waveguide, even though the optical signal experiences different refractive indices as it propagates from the input waveguide to the first or second output waveguides. Thus, even though an optical signal passing from the input waveguide to either output waveguide must completely traverse the trench, the distance over which the optical signal must travel between the waveguides is small enough so as to not affect the optical transmission characteristics of that signal.

The input waveguide and the second output waveguide are arranged generally on the same side of the trench such that an optical signal passing from the input waveguide to the second output waveguide does not completely traverse the trench. Once again, even though the optical signal experiences different indices of refraction, it propagates over a distance too small to adversely affect the optical transmission characteristics of that signal.

Both 1×2 and 2×2 optical switches can be constructed in accordance with this invention.

The invention accordingly comprises the features of construction, combination of elements, and arrangement of parts which will be exemplified in the disclosure herein. The scope of the invention will be indicated in the claims.

BRIEF DESCRIPTION OF THE DRAWINGS

In the drawing figures, which are not to scale, and which are merely illustrative, and wherein like reference characters denote similar elements throughout the several views:

FIGS. 11A and 11B depict the assembly of an optical switch in accordance with an embodiment of the present invention; and FIGS. 12A and 12B are partial side cross-sectional views showing portions of the structure of optical switches in accordance with the present invention manufactured using flip-chip and monolithic fabrication techniques, respectively, together with external components and connecting hardware.

DETAILED DESCRIPTION OF THE PRESENTLY PREFERRED EMBODIMENTS

The present invention is directed to an optical switch having an input waveguide and two output waveguides separated by and disposed around a trench. The input waveguide and a first output waveguide have respective optical paths defined by their respective cores; those optical paths (and cores) being aligned or coaxial with each other. Those waveguides are also separated by the trench, the trench having a medium provided therein that has a refractive index different from that of the waveguides. The input waveguide and first output waveguide are separated by a distance insufficient to affect the transmission characteristics of an optical signal propagating from the input waveguide to the first output waveguide, even though the optical signal experiences different refractive indices as it propagates from the input waveguide to the first output waveguide. Thus, even though an optical signal passing from the input waveguide to the first output waveguide must completely traverse the trench, the distance over which the optical signal must travel between the waveguides is small enough so as to not affect the optical transmission characteristics of that signal.

The input waveguide and a second output waveguide are arranged generally on the same side of the trench such that an optical signal passing from the input waveguide to the second output waveguide does not completely traverse the trench but instead, reflects off the reflective surface of a shutter. Once again, even though the optical signal experiences different indices of refraction, it propagates over a distance too small to adversely affect the optical transmission characteristics of that signal.

That is, while the trench is large enough to allow for the finite thickness of the mirrored shutter to be placed inside the trench, the trench should also be as small as possible to minimize the light diffraction in the trench gap.

Figure 1:
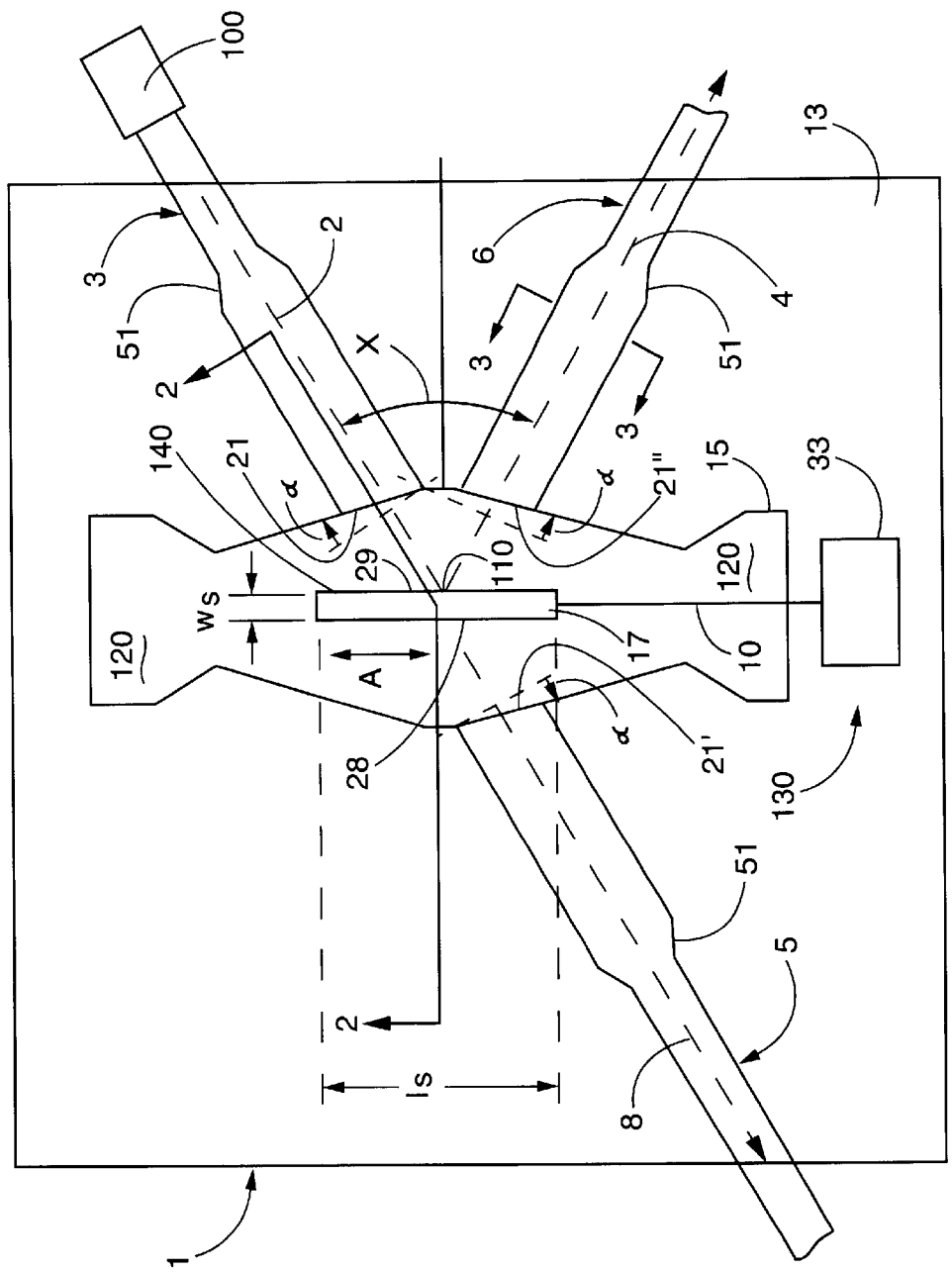
FIG. 1 is a top plan view of an optical switch constructed in accordance with the present invention.

Referring now to the drawings in detail, and with initial reference to FIG. 1, an optical switch 1 constructed in accordance with an embodiment of the present invention is there depicted. The optical switch 1 of the present invention is preferably constructed of silica-based semiconductors (e.g., $SiO_2$), and other waveguides which weakly-confine light. Other semiconductors such as, for example, GaAs and InP, also might be used. In addition, the waveguide construction described below is provided as an illustrative, non-limiting example of an embodiment of the present invention; other waveguide geometries and configurations are contemplated by and fall within the scope and spirit of the present invention.

While FIG. 1 depicts a 1×2 switch, it will be obvious to persons skilled in the art and from the disclosure herein that other configurations (e.g., 1×N or M×N) are contemplated by and within the scope and spirit of the present invention. By way of example, a 2×2 switch could be constructed by providing a second input waveguide opposite to and having an optical path coaxial with that of waveguide 6, as is discussed in greater detail below in connection with FIGS. 4A and 4B.

Figure 3:
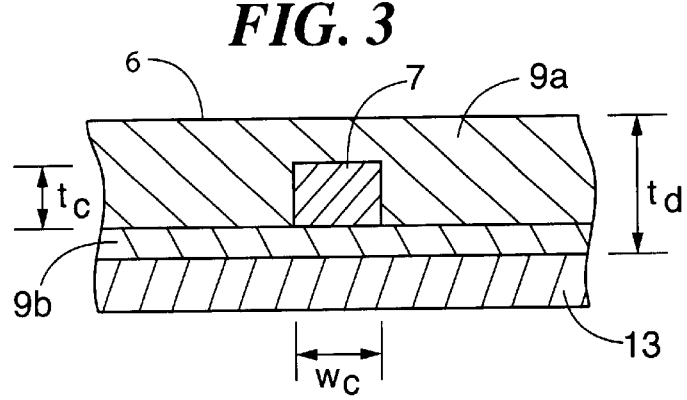
FIG. 3 is a cross-sectional view of a waveguide of the optical switch taken along line 3—3 of FIG. 1.

The switch 1 includes an input waveguide 3 and first and second output waveguides 5, 6 arranged around and separated (input waveguide 3 and first output waveguide 5) by a trench 15. A cross-section of the second output waveguide 6, which is also exemplary of the input waveguide 3 and first output waveguide 5, is depicted in FIG. 3. The following description of and reference to the second output waveguide 6 shall also apply to the input and first output waveguides 3, 5. The waveguide 6 is constructed using semiconductor fabrication techniques and methods known to those skilled in the art, and thus need not be described in detail here. The waveguide 6 includes a core 7 deposited on a lower cladding layer 9b, which is deposited on a substrate 13. By way of non-limiting example, the substrate could be silicon, quartz or $SiO_2$. An upper cladding layer 9a is deposited over and around the core 7 to form a buried waveguide configuration.

The waveguides 3, 5, 6 may be formed from a wide variety of materials chosen to provide the desired optical properties. While it is preferable to construct the optical switch 1 of the present invention on a silica-based ($SiO_2$) platform, other semiconductors that provide the desired optical properties may also be used. For example, the core 7 might include germanium-doped silica, while the upper and lower cladding 9a, 9b may include thermal $SiO_2$ or boron phosphide-doped silica glass. This platform offer good coupling to the fiber and a wide variety of available index contrasts (0.35% to 1.10%). Other platforms which could be used include, by way of non-limiting example, $SiO_xN_y$, polymers, or combinations thereof. Other systems such as indium phosphide or gallium arsenide also might be used.

With continued reference to FIG. 3, the core 7 can have an index of refraction contrast ranging from approximately 0.35 to 0.70%, and more preferably, the index of refraction can range from approximately 0.35 to 0.55% to allow for a high coupling to an output fiber. The core 7 can be rectangular, with sides running from approximately 3–10 $\mu$m thick and approximately 3–15 µm wide. More preferably, the core 7 is square, with sides from approximately 6–8 µm thick and approximately 6–14 µm wide. The upper and lower cladding layers 9a, 9b adjacent to core 7 can be approximately 3–18 µm thick, and are preferably approximately 15 µm thick, and the core thickness can range from approximately 7 to 8 µm for the same reason. In choosing the ultimate core and cladding dimensions, care should be taken to allow for low horizontal diffraction and good tolerance of misalignments.

Again, these dimensions are offered by way of example and not limitation.

The present invention will work with both weakly-confined waveguides and strongly-confined waveguides. Presently, use with weakly-confined waveguides is preferred.

Referring again to FIG. 1, the core 7 of input waveguide 3 defines an optical path 2 along the waveguide's longitudinal length. That optical path 2 is generally coaxial with an optical path 8 defined by the core 7 of the first output waveguide 5. The degree of non coaxiality is determined on one side by the angle formed between the perpendicular to the propagation of the optical signal and the input waveguide-trench interface, and on the other side, by the trench length, as will be explained later. Thus, the input waveguide 3 and first output waveguide 5 may be considered to be arranged in registry with each other with aligned or coaxial optical paths, which maximizes the amount of light transferred from input waveguide 3 to first output waveguide 5.

The second output waveguide 6 also defines an optical path 4 that is oriented with respect to the input waveguide optical path 2 at a predetermined angle; preferably between approximately 30° and 80°. Thus, input waveguide optical path 2 intersects the second output waveguide optical path 4 at an intersection point 110.

A trench 15 is defined in the substrate 13 (see, e.g., FIGS. 2A and 2B) that separates the input waveguide 3 and first output waveguide 5, and around which the waveguides are arranged. The trench 15 is filled, partly or completely, with an optically transparent medium 120 such as, for example, air, having an associated index of refraction n. For air, the index of refraction is approximately equal to 1.00.

By way of non-limiting example, the trench 15 could be approximately 8–40 µm wide, and more preferably, 12–20 µm wide.

A switching element 130 facilitates switching of an optical signal between the input waveguide 3 and one of the first and second output waveguides 5, 6. The switching element 130 includes a shutter 17 provided in the trench 15 and an actuator 33 coupled to the shutter 17 by a link 10 for providing selective movement of the shutter 17, as described in more detail below. Various embodiments of the actuator 33 are contemplated by the present invention including, by way of non-limiting example, electrothermal, electrostatic, and piezoelectric, each of which is described in more detail below.

The shutter 17 is preferably made from a light yet stiff material such as silicon, polymers, metallic or dielectric materials. Such a low-mass, rigid shutter 17 can be caused to move quickly in response to an electrical signal, for example, between the position depicted in FIG. 1, in which the optical signal output from the input waveguide 3 is reflected to the second output waveguide 6, and a second position (not shown) in which shutter 17 is displaced out of the light path so that an optical signal output from the input waveguide 3 passes to the first output waveguide 5.

A highly-reflective coating is provided on at least one surface 140 of the shutter 17, preferably the surface facing the output facet 21 of the input waveguide 3. Using gold for that coating provides a highly reflective face 29 at surface 140 which reflects the light without distortion (approximately 95% reflection) and is essentially wavelength independent for telecommunication, data communication, and spectroscopic applications, for example. The term "facet" refers to an end of a waveguide.

With continued reference to FIG. 1, the back 28 of shutter 140 could in like manner be coated with gold. Such coating would allow switch 7 to operate in the alternate mode, described above, whereby a 2×2 switch could be constructed by providing a second input waveguide (not shown) opposite to and having an optical path coaxial with that of waveguide 6. In that structure light could be directed from the second waveguide by reflection off the back 28 of shutter 140 into output waveguide 5. The 2×2 switch is described in greater detail hereafter in connection with FIGS. 4A and 4B.

The shutter 140 can be from approximately 1–8 µm thick, approximately 10–100 µm high, and approximately 10–100 µm long. The 140 shutter can be made from any sufficiently rigid and light material. Preferably, the shutter 140 is approximately 2 µm thick, approximately 30–40 µm high, and approximately 30–40 µm long. By way of non-limiting example, the shutter 140 is also preferably made from silicon, and the reflective surface(s) 28, 29 can be made from gold.

Figure 2A:
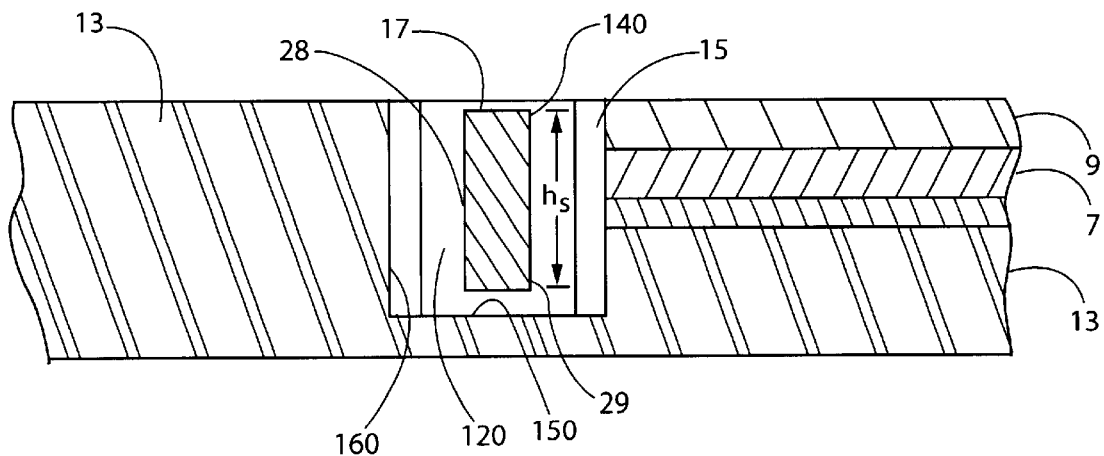
FIGS. 2A and 2B are cross-sectional views of two embodiments of an optical switch taken along line 2—2 of FIG. 1.

With continued reference to FIG. 2A, the shutter 17 has a height $h_s$ sufficient to completely block and reflect light when the shutter 17 is in the second position. It will be appreciated that to block incoming optical signals completely, the shutter 17 should have a height $h_s$ greater than the thickness $t_c$ of core 7 and a length $l_s$ greater than the width $w_c$ of core 7. The length $l_s$ of the shutter 17 is preferably minimized to reduce the distance required for the shutter 17 to be moved from the first position to the second position, which also reduces the electrical power required to move the shutter 17 in and out of the optical path and improves the speed of the switch 1.

The width $w_s$ of the shutter 17 affects the insertion loss in the reflected light path. Specifically, a thinner shutter 17 may lower the insertion loss, with a preferred dimension for the shutter width being approximately 2 µm. The optical loss of the light reflected off the reflective surface 29 of the shutter 17, due to light diffraction in the trench 15, can be minimized by having the smallest possible mirror thickness.

With continued reference to FIG. 1, the input waveguide 3 receives an optical signal (e.g., a WDM, DWDM, UDWDM, etc.) from an optical source 100 (e.g., optical fiber cable, laser, etc.) and guides the optical signal in the core 7 and along an optical path 2. The optical signal exits the input waveguide 3 via an output facet 21 and enters the trench 15. Depending upon the position of the shutter 17, the optical signal will either propagate across the trench 15 and enter the first output waveguide 5 via an input facet 21', or strike and reflect off coating 29 of face 140 (or, if no coating is provided, face 140 itself) and propagate across a part of the trench 15 and enter the second output waveguide 6 via an input facet 21". In either case, the optical signal will continue to propagate and be guided by the core 7 of the respective waveguide along that waveguide's optical path.

With continued reference to FIG. 1, the actuator 33 of the switching element 130 controls the movement of the shutter 17 between the first and second positions. Movement of the shutter 17 may be in virtually any direction (e.g., along a plane parallel with or perpendicular to the bottom surface 150 of the trench 15), so long as that movement provides the ability to switch the optical signal between either of the output waveguides 5, 6. For example, FIGS. 1 and 2A depict a first embodiment of the switching element 130 having a shutter 17 that is movable along a plane generally parallel with the plane of the bottom surface 150 of the trench 15 and in a direction generally indicated by arrow A (FIG. 1).

Figure 2B:
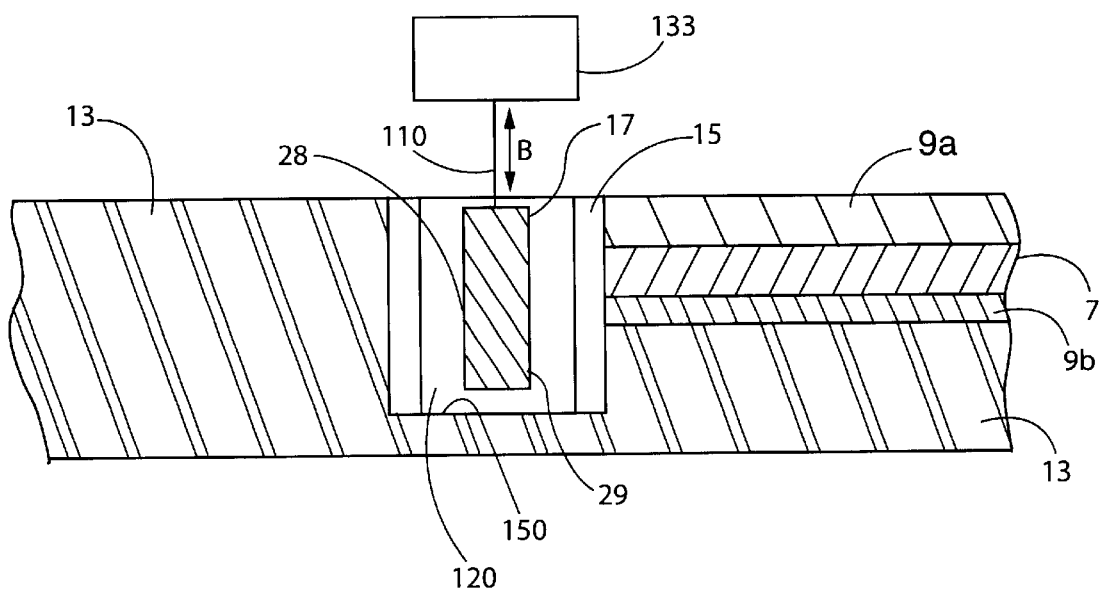

Another embodiment is depicted in FIG. 2B in which the shutter 17 is movable along a plane generally perpendicular with the bottom surface 150 of the trench 15 and in a direction generally indicated by arrow B. The movement direction of the shutter 17 is not critical, provided that the shutter 17 is movable into and out of the optical path 2 defined by the input waveguide 3. When positioned in that optical path 2, the optical signal will reflect off the shutter 17 and be redirected into the second output waveguide 6. When positioned out of that optical path 2, the optical signal will traverse the trench 15 and into the first output waveguide 5. Movement of the shutter 17 by the actuator 133 may be in response to a control signal input to the actuator 133. That signal may be electrical, optical, mechanical, or virtually any other signal capable of causing the actuator to respond.

Figure 4A:
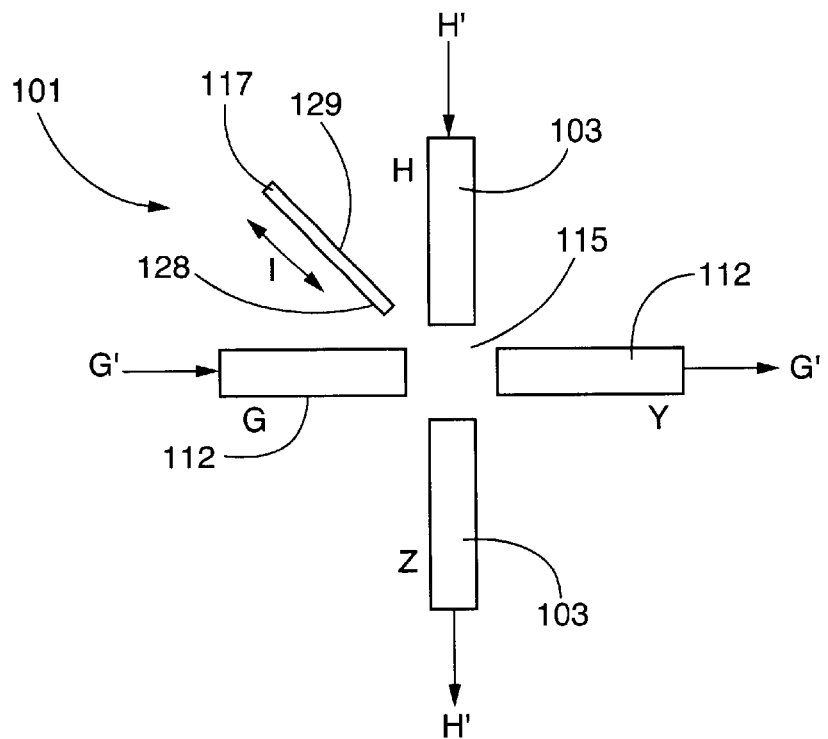
FIGS. 4A and 4B are top plan views of another optical switch constructed in accordance with the present invention, FIG. 4A depicting the switch in a first position, and FIG. 4B showing the switch in another position.
Figure 4B:
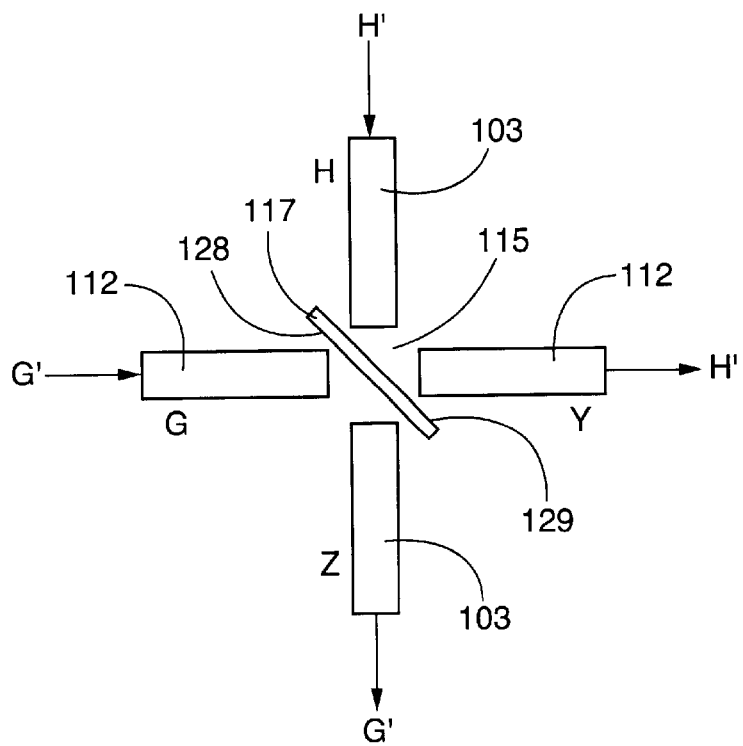

Turning now to FIGS. 4A and 4B, it will be appreciated that the reflective shutter 117 is a very attractive switching element because both sides 128, 129 of the shutter 117 could be used for switching. This feature simplifies the construction of switch matrices, since a smaller number of shutters need be used to construct larger switches. In the case of a 2×2 switch, for example, only one shutter 117 is needed to form a true 2×2 non-blocking switch. This is a remarkable improvement over other technologies, such as the use of a thermo-optical Mach-Zehnder Interferometer for a 2×2 non-blocking switch which requires four switching elements to achieve the 2×2 non-blocking switch.

With continued reference to FIGS. 4A and 4B, FIG. 4A depicts a 2×2 optical switch 101 constructed in accordance with the present invention. The switch 101 is a non-blocking design, which means that a light signal present at any input may be directed to any output without affecting the ability to direct a light signal present at any other input to any other output. The switch 101 is depicted in more general view in FIG. 5, which shows the switching components, together with waveguides 103 and 112.

As depicted in FIG. 4A, switch 101 has a first waveguide 112 having an input G and an output Y. The waveguide 112 is non-continuous in that its optical path is interrupted by a trench 115 formed in a semiconductor substrate (not shown). A second waveguide 103 is provided generally perpendicular to and intersecting the optical path of the first waveguide 112 at the trench 115. The second waveguide 103 includes an input H and an output Z. A mirrored shutter 117 is selectively movable in and out of the trench 15 in directions generally indicated by arrow I. The mirrored shutter 117 has two generally parallel surfaces 128, 129 that are highly reflective and that each act as a facet thus providing a dual-facet mirror 117. The mirrored shutter 117 may comprise a micro-mechanical shutter, or other suitable device, along the lines discussed previously in connection with other aspects of this invention.

When the mirrored shutter 117 is positioned out of the trench 15 as depicted in FIG. 4A, the switch 101 is in an off state. An optical signal G' present at input G of waveguide 112 will propagate therethrough and exit that waveguide 112 via output Y. Likewise, an optical signal H' present at input H of waveguide 103 will propagate therethrough and exit that waveguide 103 via output Z. Although the trench 15 interrupts the optical path of each waveguide 112, 103, the trench 15 does not otherwise affect light propagation through the waveguides 112, 103. When the mirrored shutter 117 is positioned in the trench 15 as depicted in FIG. 4B, the switch 101 is in an on state, i.e., switching will occur. A light signal G' present at input G of waveguide 112 will contact the mirrored shutter 117, reflect off surface 128, and exit the switch 101 via output Z of waveguide 103. Similarly, a light signal H' present at input H of waveguide 103 will contact the mirrored shutter 117, reflect off surface 129, and exit the switch 101 via output Y of waveguide 112.

Figure 5:
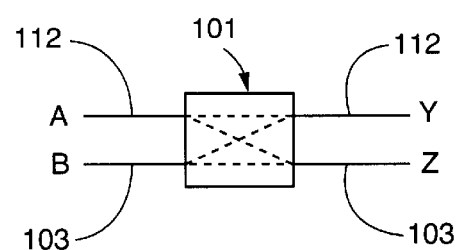
FIG. 5 is a schematic view of a 2×2 switch incorporating the optical switch shown in FIGS. 4A and 4B.

Turning now to FIG. 5, switch 101 is shown schematically, with first and second waveguides 112, 103, attached thereto.

Figure 6:
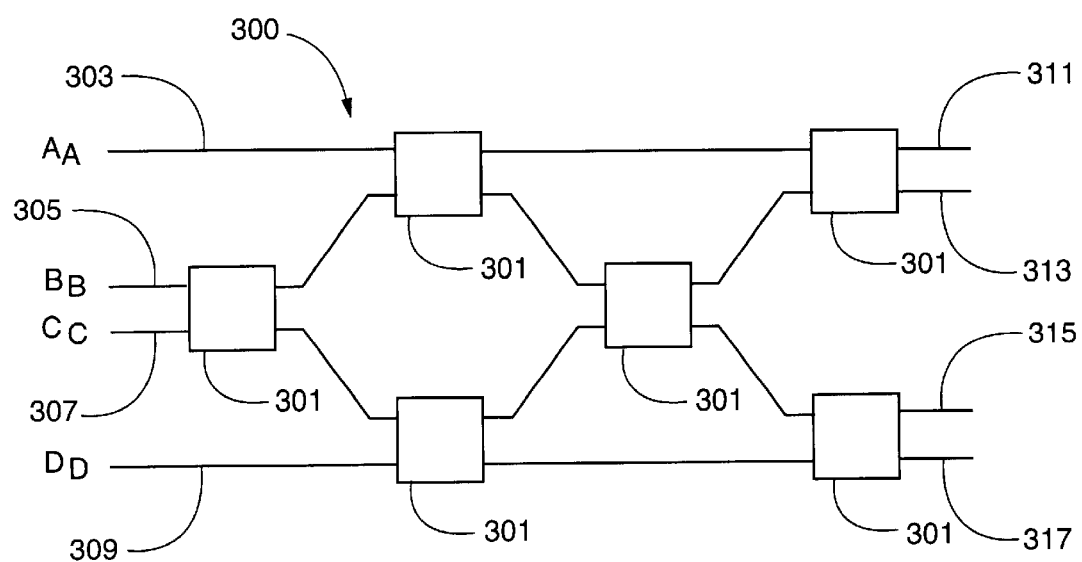
FIG. 6 is a schematic view of 4×4 switch incorporating optical switches as shown in FIGS. 4A and 4B.

FIG. 6 depicts a 4×4 switch 300 which employs six switches (also known as switching elements) 301 of the type just described in connection with FIGS. 4A and 4B (known types of 4×4 switches such as free space MEMS switches and thermo-optic Mach-Zehnder interferometer switches require sixteen switching elements). This switch 300 has four input waveguides 303, 305, 307 and 309 into which are fed signals AA, BB, CC, DD, and four output waveguides, 311, 313, 315 and 317. Switches 301 can be set in known manner so that the signals AA, BB, CC and DD entering the switch 300 through input waveguides 303, 305, 307 and 309, respectively, are routed into output waveguides 311, 313, 315 and 317 as desired. It will be appreciated that this invention reduces significantly the number of switching elements 301 which are required for the 4×4 switch 300.

Referring now to FIGS. 1 and 2B, actuator 33, 133 is joined to shutter 17 by link 10, 110 and serves to shift the shutter 17 into and out of the optical path 2. While any suitable actuator could be used to implement the present invention, either an electrothermal or electromechanical type actuator is preferred.

Electrothermal actuators are generally known in the art, and therefore will not be described in precise detail. For the purposes of this invention, it will be appreciated that any electrothermal actuator could be used which sufficiently changes its size in response to the application of thermal energy (which, it will be appreciated, could be generated by applied electrical energy). One benefit to using electrothermal actuators is that such actuators may be latching-type devices, i.e., one that maintains its position without the continuous application of energy. Thus, a latching-type actuator will remain in either one of two positions until it is caused to switch out of that position.

Figure 7:
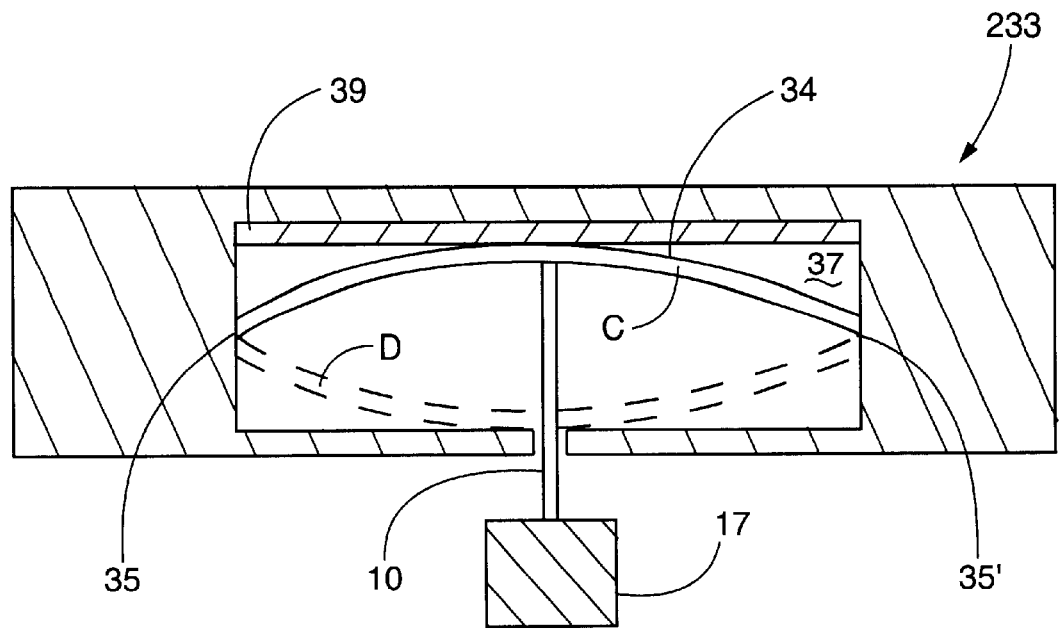
FIG. 7 is a cross-sectional top view of an embodiment of an electrothermal actuator provided as part of an optical switch in accordance with the present invention.

An exemplary electrothermal latching-type actuator 233 suitable for use with the present invention is depicted in FIG. 7. That actuator 233 includes a flexible member 34 which is securely fixed at endpoints 35, 35' to the walls of a cavity 37. Cavity 37 is sized and shaped to allow movement of flexible member 34 sufficient to cause the shutter 17 to move between the first and second position. Also provided is a heater 39, which is located in relatively close proximity with the member 34. When the heater 39 is driven, the member 34 warms and expands. Since the member's ends are secured at endpoints 35, 35', the member 34 cannot simply expand so that the endpoints shift outward. Instead, compressive stresses will be generated along the member's length. These stresses increase until they reach a level sufficient to cause the member 34 to change its position to that indicated by reference character D in FIG. 7. Thus, when the heater 39 is caused to heat (e.g., by the application of current through contacts (not shown)), the flexible member 34 also will be warmed and caused to move between an ambient position, indicated by reference character C, and a flexed position, indicated by reference character D. Alternatively, the member 34 could itself be the heater.

Figure 8:
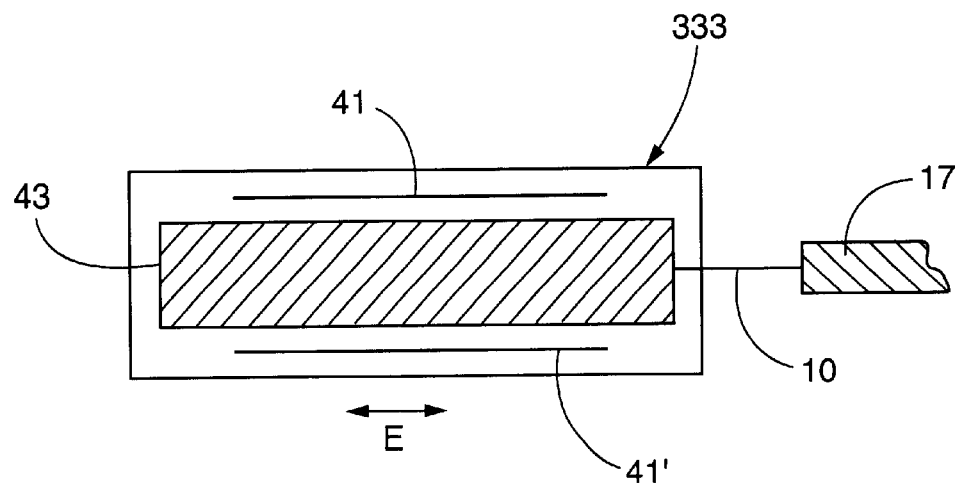
FIG. 8 is a top plan view of another embodiment of an electrostatic actuator provided as part of an optical switch in accordance with the present invention.

An electrostatic actuator may also be used to selectively move shutter 17. Benefits of electrostatic actuators include high operating speed, low energy consumption, and minimal system heating. One type of electrostatic actuator 333 usable in connection with the present invention is depicted in FIG. 8 That actuator 333 includes electrodes 41, 41' located on opposite sides of a piezoelectric element 43 made from a material which expands in at least one dimension (i.e., width or length) when an electric field is applied to the electrodes 41, 41'. Piezoelectric element 43 may thus be caused to expand in the direction indicated by arrow E, imparting movement to the shutter 17.

Figure 9:
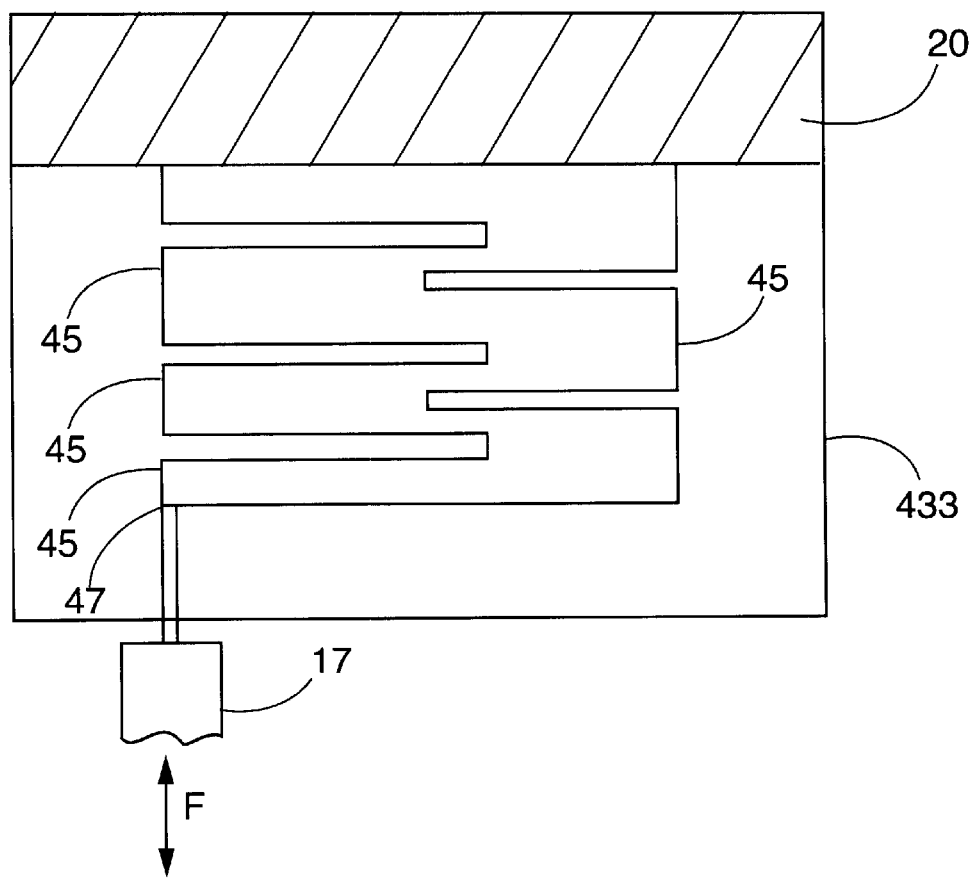
FIG. 9 is a top plan view of a further embodiment of an electrostatic actuator provided as part of an optical switch in accordance with the present invention.

It is possible that one actuator alone may not be sufficient to provide the required amount of movement for the shutter 17. This can be rectified by providing a piezoelectric actuator 433 having a number of interlaced fingers 45, such as that depicted in FIG. 9. These fingers are attached to a support 20 within actuator 433, which serves to prevent unwanted motion of one side of the fingers 45. When an electrical signal is applied to electrodes (not shown) of the actuator 433, the total displacement in the direction of arrow F of endpoint 47 will reflect the cumulative displacement of all of the fingers 45. Since the displacement of endpoint 47 is the sum of the fingers' individual displacements, a significant movement of the shutter 17 can be achieved. This type of electrostatic actuator 433 may require the application of substantial voltage, possibly on the order of 100 V, to obtain the desired movement of the shutter 17. Despite the magnitude of this voltage potential, very little power is required, since the current flow through the electrostatic actuator 433 is negligible.

Referring again to FIG. 1, each of the waveguides 3, 5, 6 have an associated index of refraction determined, at least in part, by the material from which the waveguide core 7 is constructed. The associated index of refraction for the waveguides 3, 5, 6 are approximately equal to each other, and have a value of approximately 1.45 for the silica platform. The medium 120 provided in the trench 15 also has an associated index of refraction that may be different than the waveguide refractive indices. If the medium is air, for example, its refractive index is 1.00. When an optical signal experiences different refractive indices as it propagates, certain characteristics of that signal may be caused to change as a result of the different indices. For example, when an optical signal experiences different refractive indices as it propagates, part of the optical signal (in terms of optical power) may be reflected back into the input waveguide and along optical path 2. That reflected signal can propagate back to the source and cause it to destabilize.

Additionally, the optical signal may experience a phase shift when it passes from a material having a first refractive index to a material having a second and different refractive index. In some cases, that is the desired result. For an optical switch, it is preferable that the optical signal not experience any significant change in its optical characteristics as it is guided along and switched by the various components that make up the switch.

To overcome the undesirable effects of the differing refractive indices, the present invention controls the distance between the output facet 21 of the input waveguide 3 and the input facets 21', 21" of the output waveguide 5, 6 so that the optical signal propagates too short a distance for the difference in refractive indices to introduce any significant change in the optical signal characteristics. Thus, even though the optical signal completely traverses the trench 15 (from input waveguide 3 to first output waveguide 5), or partly traverses the trench 15 (from input waveguide 3 to second output waveguide 6), the optical signal does not experience any significant adverse affect due to the difference in the medium and waveguide respective refractive indices.

Another aspect of the present invention compensates for optical return loss (ORL) caused when an optical signal passes between materials having different refractive indices. The difference in refractive indices may cause part of the optical signal (in terms of optical power) to be reflected and propagate back into the input waveguide and along optical path 2, for example. That reflected signal can disadvantageously reflect back to and possible destabilize the optical signal source. By angling the output facets 21, 21', 21" with respect to the respective waveguide's optical path, (see, e.g., FIG. 1), any reflected signal is directed away from the waveguide core 7 and toward the cladding 9a or 9b, thereby preventing the reflected light from interfering with the optical signal being guided by and propagating in the input waveguide 3. In an embodiment of the present invention, the output facets 21, 21', 21" may be disposed at an angle a of about 5° to 10°, and more preferably, about 6°–8° to minimize the loss of light reflecting back into the input waveguide 3. For the preferred case of 6°, the shift against coaxiality mentioned earlier ranges from 0.2 $\mu$m for a 5.0 $\mu$m trench to 1.7 $\mu$m for a 35 $\mu$m trench.

In another aspect of the present invention, optical return loss may be further minimized by applying an antireflective coating (not shown) to the waveguide facets 21, 21', 21". The antireflective coating can be single layer or a multilayer structure. Such a coating can reduce reflection at the waveguide-trench interface from 3.5% to below 1% over a large range of wavelengths. The materials and thickness forming the antireflection coating layers are identical to those used in thin film technology. For example, the best single layer antireflection coating layer between a silica waveguide and a trench at the wavelength of 1.55 $\mu$m has an refraction index of 1.204 and a thickness 322 nm.

In yet another embodiment, optical return losses may be minimized by using a combination of an angled interface and an antireflection coating.

Figure 10:
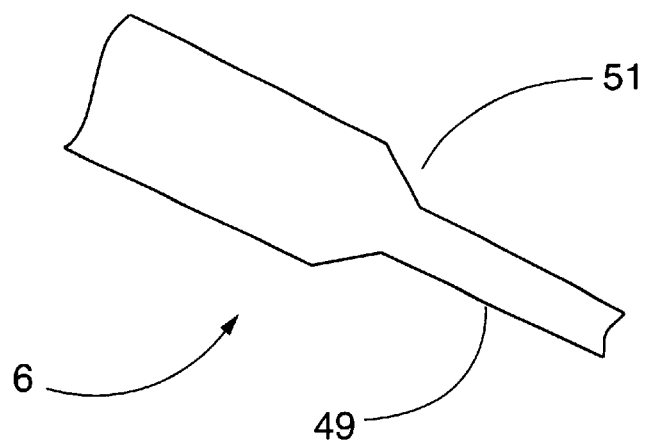
FIG. 10 is a top plan view showing a close-up of a portion of a tapered portion of the waveguide of FIG. 1.

Another aspect of this invention relates to the shape of the waveguides 3, 5, 6 used to direct light to and from the switch 1. According to this aspect of the invention, and as shown in FIGS. 1 and 10, a tapered neck region 51 is provided on at least one of the waveguides 3, 5, 6 so that the waveguide width tapers to a smaller cross-section at a location 49 remote from the trench 15. Tapered neck 51 helps to reduce the diffraction of light in the trench.

By way of non-limiting example only, in the region of the trench 15, the waveguide width may be in the range of approximately 5–15 $\mu$m. That width may taper to a range of approximately 4–10 $\mu$m at the remote location 49. These dimensions, it will be appreciated, are by way of example, and other dimensions also might fall within the scope and spirit of the present invention.

Tapered neck region 51 provides a smooth transition as the optical signal propagates along and is guided by the waveguides 3, 5, 6. Tapered neck region 51 confines the light traveling through the waveguide, in accordance with known principals of waveguide optics, and greatly reduces the transition loss which would otherwise occur where light passes between waveguides having different dimensions.

Various taper lengths and taper rates could be used, depending upon the particular considerations of a given installation.

The optical switch 1 of the present invention can be monolithically formed or assembled using a flip-chip manufacturing technique, the latter being generally depicted in FIGS. 11A and 11B. In flip-chip manufacturing, the waveguides 3, 5 and 6 and trench 15 are monolithically formed on a first chip 200 using known semiconductor fabrication techniques and processes (e.g., deposition, etching, etc.), and the shutter 17 and actuator 33 are formed on a second chip 210. Prior to assembly, the two chips are oriented to face each other, and aligned so that corresponding parts (e.g., shutter 17 and trench 15) of the chips oppose one another. The chips are then joined.

Alternatively, in another embodiment of the present invention, the optical switch 1 may be constructed by monolithically forming the switching element 130 and waveguides 3, 5, 6. In such an embodiment, the various parts of the optical switch 1 are formed on a single substrate 13 through the selective deposition and removal of different layers of material using now known or hereafter developed semiconductor etching techniques and processes. One of the benefits of monolithic fabrication is that it avoids the need to register the different components before the two substrates are joined.

Referring next to FIGS. 12A and 12B, both a flip-chip and monolithically formed optical switch 1 in accordance with the present invention are there respectively depicted. Both figures also depict connection of the optical switch 1 to external optical components such as, for example, optical fibers 67, such that waveguide cores 7 optically connect with fiber cores 65. Each optical fiber 67 is supported by a grooved member 69, and secured in place using a fiber lid 63. A glass cover 61 protects the underlying switch components. Alternative ways of securing the optical fibers, or of using other light pathways, also could be used.

One difference between the two fabrication techniques is the location of the switching element 130: above the waveguides for flip-chip and within the substrate 13 for monolithic.

It should be understood that this invention is not intended to be limited to the angles, materials, shapes or sizes portrayed herein, save to the extent that such angles, materials, shapes or sizes are so limited by the express language of the claims.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall there between. In particular, this invention should not be construed as being limited to the dimensions, proportions or arrangements disclosed herein.

What is claimed is:

1. An optical switch for switching an optical signal from an optical source, the optical switch comprising:

a first waveguide having an associated index of refraction, the first waveguide guiding the optical signal along a first waveguide optical path generally defined by a longitudinal axis of the first waveguide;

a second waveguide having an associated index of refraction, the second waveguide guiding the optical signal along a second waveguide optical path generally defined by a longitudinal axis of the second waveguide and generally coaxial with the first waveguide optical path;

a third waveguide having an associated index of refraction, the third waveguide guiding the optical signal along a third waveguide optical path generally defined by a longitudinal axis of the third waveguide and that is oriented with respect to the first waveguide optical path at a predetermined angle;

the first, second and third waveguides being arranged around a trench that separates two of the waveguides and that has a medium with an associated index of refraction, wherein the first waveguide has a first facet through which the optical signal exits the first waveguide to enter the trench, the second waveguide has a second facet through which the optical signal leaving the trench enters the second waveguide, and the third waveguide has a third facet through which the optical signal reflected by the reflective surface and leaving the trench enters the third waveguide, at least one of the first facet, second facet and third facet being independent from and not parallel with the other facets, at least one of the first, second and third waveguide facets being angled with respect to the corresponding waveguide's optical path;

a shutter disposed in the trench and having a reflective surface; and an actuator connected to the shutter for causing the shutter to move between a first position in which the optical signal from the first waveguide passes across the trench into the second waveguide, and a second position in which the optical signal from the first waveguide is reflected by the reflective surface into the third waveguide.

2. An optical switch according to claim 1, wherein the first and the second waveguides are separated by a distance of not more than approximately 8–40 $\mu$m.

3. An optical switch according to claim 2, wherein the trench first and the second waveguides are separated by a distance of not more than approximately 12–20 $\mu$m.

4. An optical switch according to claim 3, wherein the trench has a substantially constant depth.

5. An optical switch according to claim 3, wherein the trench has a variable depth.

6. An optical switch according to claim 1 wherein each of the first, second and third waveguide facets is angled with respect to the corresponding waveguide's optical path.

7. An optical switch according to claim 6, wherein the angle of each of the facets is angled by between approximately 6° and 10°.

8. An optical switch according to claim 1, wherein the second waveguide has a first width and a second width narrower than the first width, and a tapered transition joining the first and the second widths, the first width being provided at the facet.

9. An optical switch according to claim 8, wherein the third waveguide has a first width and a second width narrower than the first width, and a tapered transition joining the first and the second widths, the first width being provided at the facet.

10. An optical switch according to claim 1, wherein the index of refraction of the first, second and third waveguides is approximately the same.

11. An optical switch according to claim 1, wherein at least one of the first, second and third waveguide facets is angled by between approximately 6° and 10°.

12. An optical switch according to claim 1, wherein the actuator is an electrothermal actuator.

13. An optical switch according to claim 1, wherein the actuator is one of a piezoelectric actuator or an electrostatic actuator.

14. An optical switch according to claim 1, wherein the trench has a surface and wherein the shutter is caused to move between the first and the second positions along a line generally parallel to the surface.

15. An optical switch according to claim 1, wherein the trench has a surface and wherein the shutter is caused to move between the first and the second positions along a line generally intersecting the surface.

16. An optical switch according to claim 1, wherein the first waveguide has a first width and a second width narrower than the first width, and a tapered transition joining the first and the second widths, the first width being provided at the facet.

17. An optical switch according to claim 1, wherein the shutter is approximately 2 $\mu$m wide and between approximately 20 and 70 $\mu$m long.

18. An optical switch according to claim 1, wherein the actuator is a latching type device.

19. A method of switching an optical signal in an optical switch, the optical signal being guided by and exiting from an exit facet of an input waveguide to an input facet of one of a first and second output waveguides, the input facet of first output waveguide being independent of the input facet of the second output waveguide, the input waveguide defining an optical path that is coaxial with an optical path defined by the first output waveguide, and intersecting an optical path defined by the second output waveguide, the input waveguide and first and second output waveguides each having an associated index of refraction, the input waveguide and the first output waveguide being disposed on opposite sides of a trench having provided therein a medium with an associated index of refraction that is different than the index of refraction of the waveguides, the method comprising the step of angling at least one of the exit facets or input facet with respect to the corresponding waveguide's optical path.

20. A method according to claim 19, wherein the trench has a width of between approximately 8–40 $\mu$m and that determines the distance separating the input waveguide and the first output waveguide.

* * * * *